Feb. 2, 1960  D. W. OSMUN  2,923,332
STUMP PLANING MACHINE
Filed July 1, 1957  2 Sheets-Sheet 1

Dean W. Osmun
INVENTOR.

BY
Charles E. Lightfoot
ATTORNEY

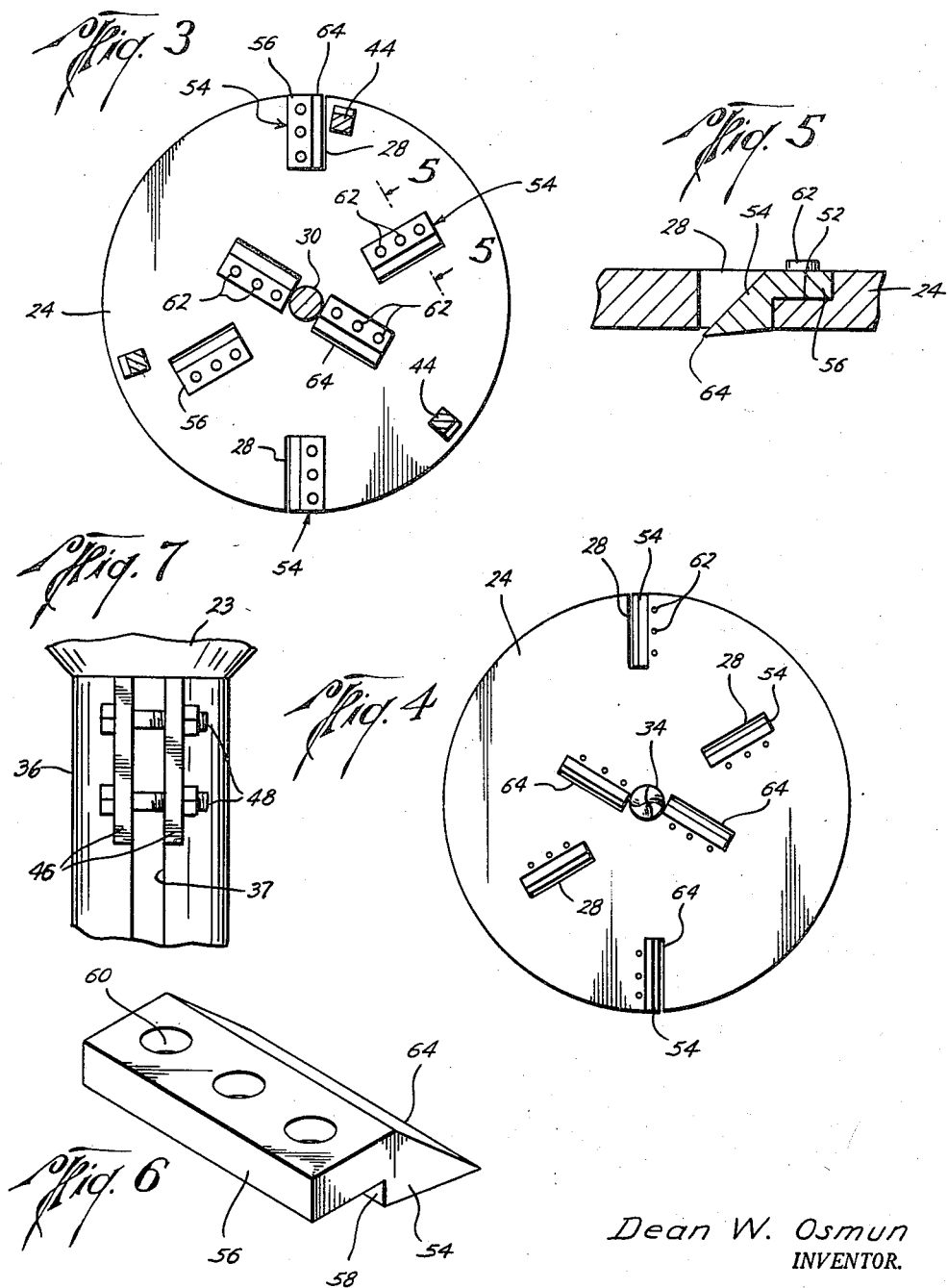

United States Patent Office 2,923,332
Patented Feb. 2, 1960

2,923,332

STUMP PLANING MACHINE

Dean W. Osmun, Houston, Tex.

Application July 1, 1957, Serial No. 669,262

2 Claims. (Cl. 144—219)

This invention relates to stump cutting apparatus and more particularly to mechanism for use with a tractor or other power equipment for milling or planing away the stumps of trees in the clearing of land.

The invention finds particular application in connection with land clearing operations in connection with the preparation of land for use as pasture, in the production of hay, or for other similar uses.

In the clearing of land as heretofore commonly practiced, it has been customary to remove trees and brush by cutting, or by uprooting the same by the use of bulldozers or suitable grubbing equipment. Removal of trees and brush from land by cutting the same results in leaving numerous stumps, which interfere with the growth of grass, and which also prevents the cutting of hay, while the uprooting of trees often results in substantial disturbance of the earth, the production of holes, furrows and other surface irregularities, making it necessary to carry out extensive scraping and filling operations to restore the ground to a level condition. Moreover the removal of stumps by the customary method of bulldozing or grubbing is often too costly for satisfactory use.

It has been proposed heretofore to make use of horizontally rotatable saws for the clearing of land, whereby trees and the like can be cut off substantially flush with the ground surface. This method has not proved satisfactory, however, because of the rapid dulling of the saws due to the abrasive action of the earth with which they come in contact. In order to avoid the necessity of frequently resharpening such saws it has become customary to cut off the trees at a height above the ground thereby leaving substantial stumps still to be removed.

The present invention has for an important object the provision of stump cutting apparatus whereby land may be rapidly and inexpensively cleared of stumps down to the ground level, whereby the utility of the land may be greatly improved without disturbing its level condition.

Another object of the invention is to provide stump cutting apparatus which is designed to remove stumps by milling or planing away the stumps down to the ground level.

A further object of the invention is the provision of stump cutting apparatus which may be used to cut away stumps down to the ground level, while at the same time avoiding contact of the cutting elements with the ground, whereby dulling of the cutting elements by the abrasive action of the earth is prevented.

Another object of the invention is to provide stump cutting apparatus embodying cutting means adapted for horizontal rotation and having means for stabilizing the operation of the cutter and maintaining the same in centered relation to the stump during the cutting operation.

A further object of the invention is to provide stump cutting apparatus which is adapted to be used as an attachment on a tractor or other power vehicle, whereby the apparatus may be rapidly moved about from place to place and raised or lowered to conduct the cutting operation.

A still further object of the invention is to provide stump cutting apparatus of simple design and rugged construction, having cutting elements which may be easily removed and replaced for purposes of repair and maintenance, and which is capable of long withstanding the extreme conditions of hard usage to which apparatus of this character is customarily subjected.

The above and other important advantages and objects of the invention may best be understood from the following detailed description constituting a specification of the same, when considered in conjunction with the annexed drawings, wherein—

Figure 3 is a cross sectional view taken along the line 3—3 of Figure 2, looking in the direction indicated by the arrows;

Figure 4 is a bottom plan view of the rotary cutting head of the invention, looking at the bottom of the same as illustrated in Figure 2;

Figure 5 is a fragmentary cross-sectional view on an enlarged scale taken along the line 5—5 of Figure 3, showing the construction and arrangement of the cutting blades of the invention, whereby the same are made removable;

Figure 6 is a perspective view of one of the cutter elements or blades of the invention; and Figure 7 is a fragmentary side elevational view, on an enlarged scale, showing details of structure of the cutter head attaching means of the invention as illustrated in Figure 1.

Figure 1:
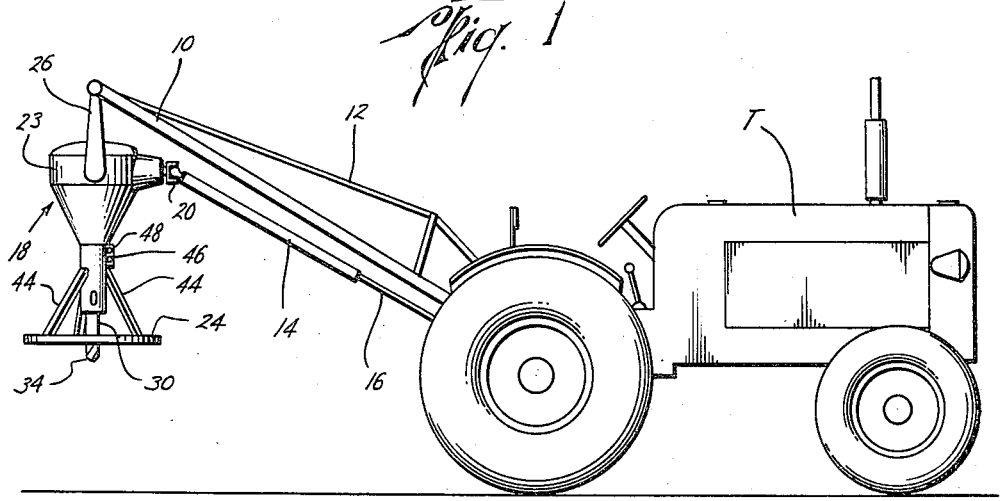
Figure 1 is a side elevational view illustrating a preferred embodiment of the invention, and showing the same applied to a tractor.

Referring now to the drawings in greater detail the invention is illustrated herein in connection with its use on a tractor of conventional design, such as that indicated at T, having power lift mechanism and power take off mechanism of the usual kind, not shown, by which the cutting apparatus is supported to be moved about from location to location, raised and lowered into and out of contact with a stump, and rotated during the cutting operation.

The cutting apparatus of the invention is supported at the outer end of a suitable frame having frame elements 10, which are spaced apart at their outer ends, the frame being pivotally connected at its outer end to the tractor for vertical swinging movement and being connected to the hydraulic lift mechanism of the tractor in the usual manner, whereby the frame may be elevated and lowered to position a cutting apparatus at any desired height. The supporting frame may also be provided with suitable bracing means, such as that indicated at 12.

The cutting apparatus of the invention is operated from the power take off mechanism of the tractor through a telescoping drive shaft, formed in two parts, 14 and 16, the part 14 being tubular and the part 16 being slidable therein and rotatable therewith and being connected at one end to the power take off mechanism of the tractor. The operating mechanism of the cutter also includes suitable gearing, such as the right angle drive mechanism generally indicated at 18, having a driven element which is connected to the tubular section 14 of the drive shaft, as by means of a universal joint 20 for rotation therewith, and also having a driven shaft 22. The right angle drive mechanism is of well known construction and may be enclosed within a housing 23 having upwardly extending side arms 26 which are pivotally connected at their upper ends to the outer ends of the frame element 10 so that the right angle drive mechanism is suspended between the frame elements 10, whereby the cutter will remain in a substantially vertical position in all positions of the frame.

The cutting apparatus of the invention comprises a cutting head 24, which may take the form of a flat, circular disk of suitable thickness, having a number of substantially radially extending slotted openings 28 therethrough. The cutter head has a central shaft 30 extending through a central opening through the head, and having a transverse key-way 32 (Figure 2), and whose lower end portion is shaped to form a drill point 34. A tubular element 36 surrounds the shaft 30 above the head, and is keyed thereto by a key 38, which extends through the key-way 32 and into aligned openings 40 and 42 in the tubular element, whereby the shaft will rotate with the element. The cutter head is also connected to the tubular element by upwardly extending diagonal braces 44, secured to the head and element in any suitable manner, as by welding or the like, to securely hold the head in a position at right angles to the shaft and to cause the head to rotate with the tubular element.

Figure 2:
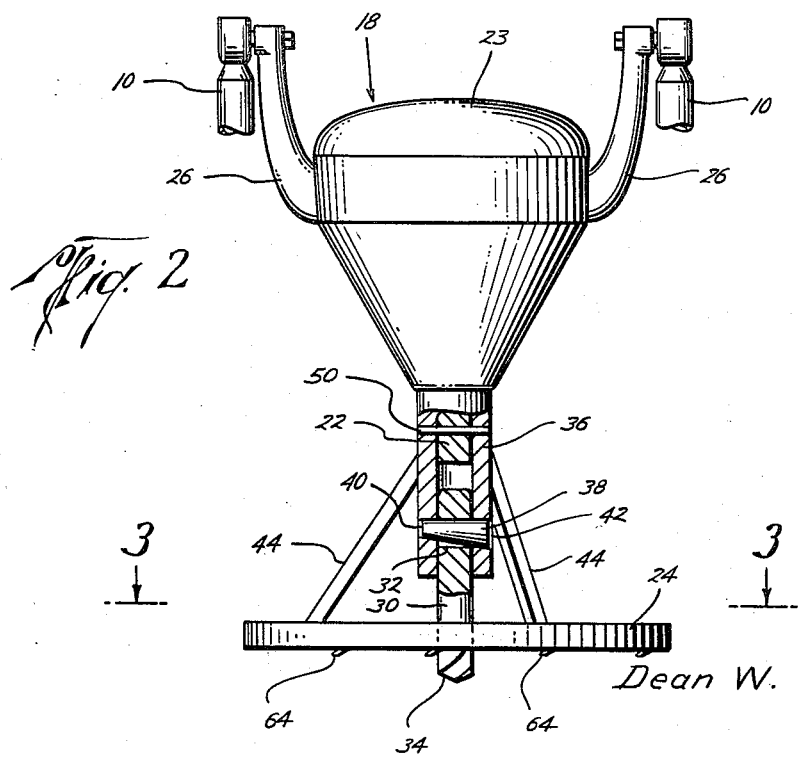
Figure 2 is a fragmentary front elevational view partly in cross-section and on an enlarged scale of the cutter of the invention as illustrated in Figure 1.

The tubular element 36 may be slotted longitudinally at its upper end, and provided with external flanges, such as that indicated at 46 (Figure 1), on opposite sides of the slot, which flanges may be provided with aligned openings for the reception of bolts 48 or the like, whereby the tubular element may be clamped about the driven shaft 22, which extends into the upper end of the element and which may also be secured to the element by means of a pin 50 (Figure 2). By this arrangement the cutter head may be caused to rotate with the driven member 22.

The cutter head is also formed with radially extending recesses along each of the slots 28, as indicated at 52 (Figure 5), and cutter elements 54 are positioned in the slots, each of which cutter elements has a flange 56 positioned in the recess 52, and is formed with a shoulder 58 (Figure 6), which engages the cutter head along the side wall of the slot adjacent to the recess 52. The cutter elements are provided with suitable openings 60, through which fastening elements, such as the screws 62, are extended, which screws also extend into threaded openings in the cutter head, whereby the cutter elements are securely fastened to the head. The cutter elements are formed with cutting edges 64, and are shaped so that the cutting edges are positioned slightly below the lower face of the cutter head, as seen in Figure 5, whereby the cutter elements act as planes in the operation of the apparatus.

The slots 28 and cutting elements 54 are so arranged that the cutting elements will perform a cutting operation throughout substantially the entire area of the head as the head is rotated.

In making use of the invention, constructed and arranged as described above, the tractor is moved to a position such that the cutting head is suspended vertically immediately above a stump to be cut, and the hydraulic lift mechanism of the tractor is then operated to lower the cutter into engagement with the stump, while the cutter head is being rotated by the power take off mechanism through the right angle drive mechanism. As the cutter is lowered into contact with the stump the drill point 34 will first engage the stump to form a centrally located hole in the stump, and thereafter the cutting edges 64 of the cutter elements will perform a planing action on the stump to cut away the stump. The drill point will hold the cutter head centralized during the cutting operation, so that the cutting apparatus does not wobble and the planing action of the cutter elements will take place uniformly.

By first sawing off stumps, trees, brush and the like close to the ground surface, whereby the saw is kept out of contact with the earth, so that the saw is not dulled by contact with abrasive materials, and thereafter using the cutting apparatus of the invention to plane down the stumps to the ground level, land may be quickly cleared so that it may be used as pasture and for the production of hay or other crops. Moreover, due to the fact that the stumps are cut down to the ground level it is unnecessary to remove the roots, and the remaining portion of the stump and roots are more easily affected by water whereby the process of decay is promoted.

It will thus be seen that the invention provides stump cutting apparatus which is of simple design and rugged construction, wherein the cutting elements are easily kept out of contact with abrasive material during the cutting operation and in which the cutter elements are easily removable for purposes of maintenance and repair.

The invention has been disclosed herein in connection with a certain specific embodiment of the same, but it will be understood that this is intended by way of example only, and that various changes can be made in the construction and arrangement of the parts within the spirit of the invention and the scope of the appended claims.

Having thus clearly shown and described the invention what is claimed as new and desired to secure by Letters Patent is:

1. A stump cutter comprising a cutter head in the form of a normally horizontal disk having a central aperture, a rotatably mounted driven vertical shaft above said disk, a tubular element coaxial with the shaft and disk having a longitudinal slot extending from one end toward the other end thereof and into said one end of which said shaft is extended, external flanges on the element along each side of said slot, means positioned for coaction with said flanges to move the flanges toward each other to contract the element about the shaft to form a connection between the shaft and element to cause the element to rotate with the shaft, means connecting the disk with the element to cause the disk to rotate with and below the element, said element having laterally aligned, tapering openings, a drilling bit having a shank extending through said aperture and into said other end of said element and formed with an opening therethrough positioned to be aligned with the openings of the element, a tapered pin removably extended through the openings of the element and shank and wedgingly engageable with the element in the openings of the element to releasably connect the bit to the element for rotation therewith, and cutter elements carried by the disk and having cutting edges positioned parallel to and spaced from the face of the disk on the same side of the disk with the free end of said bit.

2. A stump cutter comprising a cutter head in the form of a normally horizontal disk having a central aperture, a rotatably mounted driven vertical shaft above said disk, a tubular element coaxial with the shaft and disk into one end of which said shaft is extended, means connecting the shaft and element to cause the element to rotate with the shaft, means connecting the disk and element to cause the disk to rotate with and below the element, said element having laterally aligned, tapering openings, a drilling bit having a shank extending through said aperture and into the other end of said element and formed with an opening therethrough positioned to be aligned with the openings of the element, a pin removably extended through the openings of the element and bit and shaped for wedging engagement with the element in the openings of the element to connect the bit to the element for rotation therewith, and cutter elements carried by the disk and having cutting edges positioned parallel to and spaced from the face of the disk on the same side of the disk with the free end of the bit.

References Cited in the file of this patent

UNITED STATES PATENTS

| | | |
|---|---|---|
| 666,211 | Shortt | Jan. 15, 1901 |
| 1,012,962 | Anderson | Dec. 26, 1911 |
| 1,164,659 | Moore | Dec. 21, 1915 |
| 1,466,538 | McKoy et al. | Aug. 28, 1923 |
| 2,022,288 | Knapp | Nov. 26, 1935 |
| 2,410,508 | Lamme | Nov. 5, 1946 |
| 2,570,926 | Elmendorf | Oct. 9, 1951 |
| 2,657,723 | Johnson | Nov. 3, 1953 |
| 2,710,634 | O'Brien | June 14, 1955 |

FOREIGN PATENTS

| | | |
|---|---|---|
| 15,822 | Great Britain | Sept. 5, 1900 |